US009445267B2

(12) United States Patent
Varoglu et al.

(10) Patent No.: US 9,445,267 B2
(45) Date of Patent: Sep. 13, 2016

(54) BUMP OR CLOSE PROXIMITY TRIGGERED WIRELESS TECHNOLOGY

(71) Applicant: Apple Inc., Cupertino, CA (US)

(72) Inventors: Devrim Varoglu, Santa Clara, CA (US); Gencer Cili, Santa Clara, CA (US); Ravisastry R. Parupudi, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 426 days.

(21) Appl. No.: 13/742,425

(22) Filed: Jan. 16, 2013

(65) Prior Publication Data

US 2014/0199967 A1    Jul. 17, 2014
US 2016/0249156 A9   Aug. 25, 2016

Related U.S. Application Data

(60) Provisional application No. 61/695,677, filed on Aug. 31, 2012.

(51) Int. Cl.
*H04W 12/06* (2009.01)
*H04W 4/02* (2009.01)
(Continued)

(52) U.S. Cl.
CPC ............ *H04W 12/06* (2013.01); *H04W 4/023* (2013.01); *H04W 4/206* (2013.01); *H04W 12/08* (2013.01); *H04W 4/008* (2013.01)

(58) Field of Classification Search
CPC ... H04W 12/08; H04W 12/04; H04W 12/06; H04W 4/008; G06F 21/31; G06F 21/35
USPC ....................................................... 455/41.1
See application file for complete search history.

(56) References Cited

U.S. PATENT DOCUMENTS 6,850,147 B2   2/2005   Prokoski et al.
7,146,191 B2   12/2006  Kerner et al.
(Continued)

FOREIGN PATENT DOCUMENTS

| EP | 1 596 538 | 11/2005 |
|----|-----------|---------|
| WO | 00/51293  | 8/2000  |
| WO | 2006/071364 | 7/2006 |

OTHER PUBLICATIONS

Harchandrai, Padmini; "Apps for Sharing Data via Bluetooth on Mobile Devices;" Tech 2, Mar. 18, 2011, retrieved from <http://tech2.in.com/features/apps/apps-for-sharing-data-via-bluetooth-on-mobile-devices/208002> on Jan. 11, 2013; pp. 1-4.
(Continued)

*Primary Examiner* — Nam Huynh
(74) *Attorney, Agent, or Firm* — Meyertons Hood Kivlin Kowert & Goetzel, P.C.; Jeffrey C. Hood; Michael B. Davis

(57) ABSTRACT

Techniques for performing various communications functionality based on detecting a bump condition and/or close proximity between wireless devices. A wireless access point may be configured to automatically initiate an authentication procedure with a User Equipment (UE) device in response to detecting a bump condition and/or detecting a particular proximity between the UE device and the wireless access point. The particular proximity may be detected based on a signal strength of a radio frequency signal. The wireless access point may also be configured to disable a security protocol. A UE device may be configured to participate in an authentication procedure and/or automatically transfer data to the wireless access point in response to detecting a bump condition and/or detecting a particular proximity.

14 Claims, 9 Drawing Sheets

(51) Int. Cl.
*H04W 4/20* (2009.01)
*H04W 12/08* (2009.01)
*H04W 4/00* (2009.01)

(56) References Cited

U.S. PATENT DOCUMENTS

| | | |
|---|---|---|
| 7,174,130 B2 | 2/2007 | Kurisko et al. |
| 7,215,649 B2 | 5/2007 | Yu et al. |
| 7,254,367 B2 | 8/2007 | Helden et al. |
| 7,597,250 B2 | 10/2009 | Finn |
| 7,603,414 B2 | 10/2009 | Rosenberg |
| 8,045,961 B2 | 10/2011 | Ayed et al. |
| 2002/0140542 A1 | 10/2002 | Prokoski et al. |
| 2003/0013411 A1 | 1/2003 | Uchiyama |
| 2003/0050009 A1 | 3/2003 | Kurisko et al. |
| 2003/0124979 A1 | 7/2003 | Tanada et al. |
| 2005/0021725 A1 | 1/2005 | Lobbert |
| 2005/0044372 A1 | 2/2005 | Aull et al. |
| 2005/0152294 A1 | 7/2005 | Yu et al. |
| 2005/0159184 A1 | 7/2005 | Kerner et al. |
| 2005/0203912 A1 | 9/2005 | Beach et al. |
| 2005/0254639 A1 | 11/2005 | Rodriguez et al. |
| 2006/0003806 A1 | 1/2006 | Weber et al. |
| 2006/0068760 A1 | 3/2006 | Hameed et al. |
| 2006/0098238 A1 | 5/2006 | Ylonen |
| 2006/0183462 A1* | 8/2006 | Kolehmainen ............... 455/411 |
| 2006/0194535 A1 | 8/2006 | Houldsworth et al. |
| 2006/0219776 A1 | 10/2006 | Finn |
| 2007/0013801 A1 | 1/2007 | Sezan et al. |
| 2007/0161349 A1 | 7/2007 | Grushkevich |
| 2007/0232358 A1 | 10/2007 | Sherman |
| 2007/0263003 A1 | 11/2007 | Ko et al. |
| 2007/0293197 A1 | 12/2007 | Ekberg et al. |
| 2007/0294556 A1 | 12/2007 | Wutka |
| 2008/0057868 A1 | 3/2008 | Chang |
| 2008/0076489 A1 | 3/2008 | Rosener et al. |
| 2008/0119241 A1 | 5/2008 | Dorogusker et al. |
| 2008/0129610 A1 | 6/2008 | Tsfati et al. |
| 2008/0148052 A1 | 6/2008 | Lindsley |
| 2008/0162937 A1 | 7/2008 | Kohlenberg et al. |
| 2008/0166968 A1 | 7/2008 | Tang et al. |
| 2008/0167088 A1 | 7/2008 | Rabu et al. |
| 2008/0227393 A1 | 9/2008 | Tang et al. |
| 2008/0242229 A1 | 10/2008 | Sharma |
| 2008/0268776 A1 | 10/2008 | Amendola |
| 2008/0274770 A1 | 11/2008 | Park et al. |
| 2008/0287063 A1 | 11/2008 | Kidron et al. |
| 2008/0288845 A1 | 11/2008 | Tsfati et al. |
| 2009/0017755 A1 | 1/2009 | Tomoda |
| 2009/0060215 A1 | 3/2009 | Ocasio |
| 2009/0083847 A1 | 3/2009 | Fadell et al. |
| 2009/0137206 A1 | 5/2009 | Sherman et al. |
| 2009/0150445 A1 | 6/2009 | Herberger et al. |
| 2009/0150553 A1 | 6/2009 | Collart et al. |
| 2009/0158039 A1 | 6/2009 | Prasad et al. |
| 2009/0197640 A1 | 8/2009 | Fa et al. |
| 2009/0221234 A1 | 9/2009 | Pirzada et al. |
| 2009/0239470 A1 | 9/2009 | Sherman |
| 2009/0249407 A1 | 10/2009 | Manne et al. |
| 2011/0314168 A1* | 12/2011 | Bathiche et al. ............. 709/228 |
| 2012/0021684 A1 | 1/2012 | Schultz et al. |
| 2013/0309971 A1* | 11/2013 | Kiukkonen ........... H04L 63/107 455/41.2 |
| 2014/0127994 A1* | 5/2014 | Nightingale et al. ........ 455/41.1 |

OTHER PUBLICATIONS

International Search Report and Written Opinion for PCT/US2008/056071, mailed Jul. 25, 2008, pp. 1-18.
Office Action for Australian Patent Application No. 2008226570, dated Jun. 17, 2010, pp. 1-2.
Communication Pursuant to Rules 94(3) for European Patent Application No. 08731560.2 dated Mar. 24, 2010, pp. 1-5.
Examiner's Report for Australian Patent Application No. 2008226570, dated Aug. 18, 2011, pp. 1-2.
Examiner's Report for Australian Patent Application No. 2008226570, dated Nov. 11, 2010, pp. 1-2.
Communication pursuant to Article 94(3) EPC for European Patent Application No. 08731560.2, dated Feb. 18, 2011, pp. 1-5.
First Office Action for Chinese Patent Application No. 200880008290.7, dated Sep. 15, 2011, pp. 1-8.
International Preliminary Report on Patentability for PCT/US2008/056071, mailed Sep. 24, 2009, pp. 1-13.

* cited by examiner

BUMP OR CLOSE PROXIMITY TRIGGERED WIRELESS TECHNOLOGY

This application claims the benefit of priority to U.S. Provisional Application No. 61/695,667, filed on Aug. 31, 2012, entitled "BUMP or CLOSE PROXIMITY TRIGGERED WIRELESS TECHNOLOGY", invented by Devrim Varoglu, Gencer Cili, and Ravisastry R. Parupudi. That Provisional Application is hereby incorporated by reference in its entirety as though fully and completely set forth herein.

FIELD OF THE INVENTION

The present application relates to wireless devices, and more particularly to wireless communications based on bump conditions and/or close proximity between wireless devices.

DESCRIPTION OF THE RELATED ART

Wireless communication systems are rapidly growing in usage. Further, wireless communication technology has evolved from voice-only communications to also include the transmission of data, such as Internet and multimedia content.

Wireless communications may utilize various security protocols. Such protocols may prevent unauthorized access to a wireless network, for example. In some situations, it may be desirable to allow some nearby users to access to the network without using the security protocol or automatically authenticate a user's wireless device using the security protocol. For example, two individuals may desire to quickly transfer contact information between their respective mobile devices. As another example, an apartment owner may desire to avoid the time required to find and type a relatively long password to allow guests to access his or her local network, but may also desire to exclude other users in nearby apartments from using the local network.

Further, wireless sensors may be present in many situations where transfer of data could be used to improve security of mobile property. For example, many vehicles include wireless sensors, such as Bluetooth sensors, Zigbee sensors, IEEE 802.11p sensors, and so on. Transfer of data between such sensors may be desirable in order to identify those responsible for vehicle collisions or thefts.

In various situations, it may be desirable to automatically: initiate a connection, authenticate, transfer data, and/or bypass security protocols between wireless mobile devices.

SUMMARY OF THE INVENTION

The present disclosure relates to techniques for detecting bump conditions and/or proximity between wireless devices and automatically performing various communications functionality based on the detected bump conditions and/or proximity.

As one non-limiting example, a wireless access point may be configured to automatically authenticate with a User Equipment (UE) device based on the UE device bumping the wireless access point and/or being brought into close proximity with the wireless access point.

In one embodiment, a wireless access point includes an antenna, a processing element, and a motion sensor. In this embodiment, the motion sensor is configured to detect a bump condition involving the wireless access point and a UE device. In this embodiment, the processing element is configured to automatically initiate an authentication procedure with the UE device based on detection of the bump condition. The wireless access point may request information about the bump condition from the UE device.

In one embodiment, a wireless access point includes an antenna, a processing element, and a wireless sensor. In this embodiment, the wireless sensor is configured to detect a particular proximity between a UE device with the wireless access point. In this embodiment, the processing element is configured to automatically initiate an authentication procedure with the UE device based on detection of the particular proximity.

In one embodiment, a UE device includes an antenna, a processing element, and a motion sensor. In this embodiment, the motion sensor is configured to detect a bump condition involving the UE device and a wireless access point. In this embodiment, the UE device is configured to automatically participate in an authentication procedure with the wireless access point in response to the detected bump condition. The UE device may send information associated with the bump condition to the wireless access point. The UE device may receive bump information from the wireless access point and verify that the bump information corresponds to the detected bump condition.

In various embodiments, based on a bump condition and/or proximity, a wireless device may be configured to disabled a security protocol for another wireless device and/or transfer data to and/or from another wireless device. Transferred information may include identification information, advertising information, purchasing information, collision information, time information, and so on.

BRIEF DESCRIPTION OF THE DRAWINGS

A better understanding of the present invention can be obtained when the following detailed description of the embodiments is considered in conjunction with the following drawings.

Figure 1:
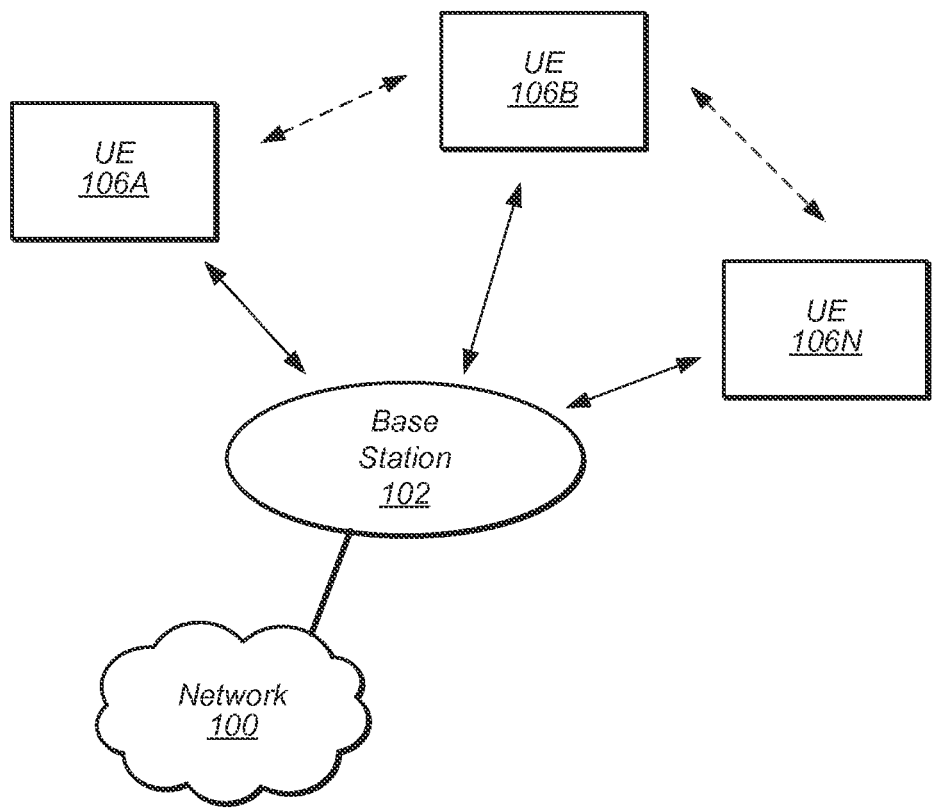
FIG. 1 is a block diagram illustrating one embodiment of an exemplary wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present patent application:

UE: User Equipment
BS: Base Station
WAP: Wireless Access Point
GSM: Global System for Mobile Communication
UMTS: Universal Mobile Telecommunication System
LTE: Long Term Evolution

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Wireless Access Point—the term "Wireless Access Point" has the full breadth of its ordinary meaning, and at least refers to a stationary device that communicates in a wireless fashion with one or more UE devices and which allows these UE devices to connect to a wide area network, such as the Internet. The wireless access point communicates with the wide area network via either a wireless connection or a wired connection. Also, the wireless access point may serve as an intermediary and connect with the wide area network via another access point. The wireless access point may communicate wirelessly with a base station using any of various cellular standards and includes both public and private hotspots. Additionally, the wireless access point may be implemented in various manners, including, but not limited to, a computer system or a programmable hardware element(s) (e.g., an FPGA), or some combination thereof.

WiFi—this term has the full extent of its ordinary meaning and at least includes a type of wireless local area network technologies defined by the IEEE 802.11 group of standards. Includes standards for 802.11a, 802.11 ac, 802.11 ad, 802.11 af, 802.11b, 802.11g, and 802.11n, among others.

WiFi Direct—this term has the full extent of its ordinary meaning and at least includes a local area network in which devices, such as UE devices, can communicate directly with one another without the use of an access point, including peer to peer connections and connections between a group of devices. Additionally, in connections between a group of devices, one of the devices may serve as a local access point for the other devices in the group.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may involve confirmation by a user. Thus, automatically initiating a data transfer may include prompting the user to confirm the transfer before actually performing the transfer. However, an automatic data transfer does not require a user to manually initiate the transfer other than such confirmation.

Configured To—is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Based On—is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Coupled To—may indicate one or more connections between elements, and a coupling may include intervening elements. For example, in FIG. 6, radio 680 may be described as "coupled to" compute complex 620, i.e., through fabric 610. In contrast, in the illustrated embodiment of FIG. 6, radio 680 is "directly coupled" to south bridge 650 because there are no intervening elements.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Figure 2:
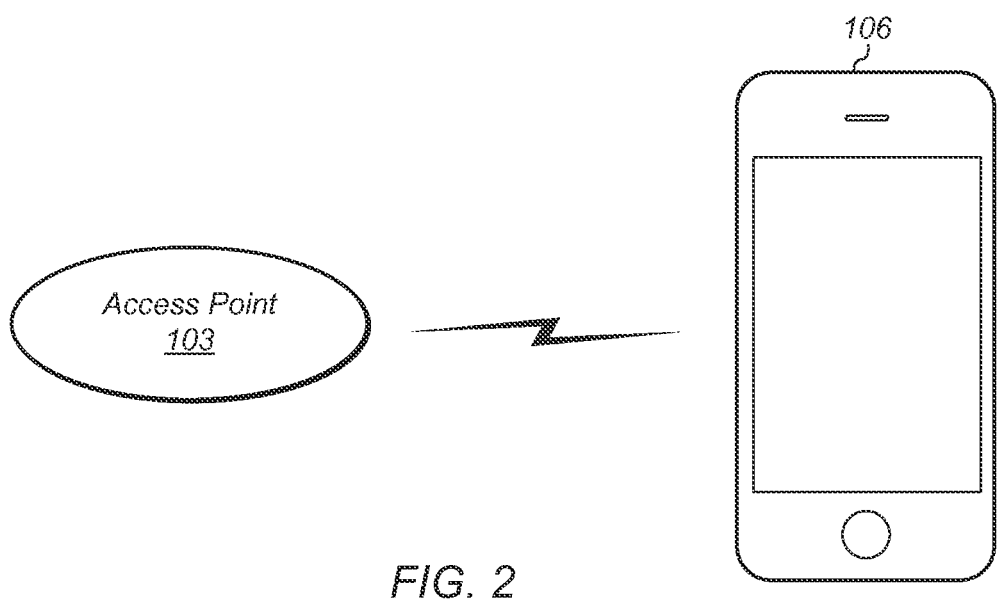
FIG. 2 illustrates one embodiment of an access point and user equipment.

FIGS. 1 and 2—Communication Systems

Referring to FIG. 1, one exemplary (and simplified) embodiment of a wireless communication system is shown. The system of FIG. 1 is merely one example of a possible wireless system, and embodiments of the invention may be implemented in any of various systems, as desired.

In the illustrated embodiment, the exemplary wireless communication system includes base station 102 which communicates over a transmission medium with one or more user devices 106A through 106N. Each of the user devices may be referred to herein as a "user equipment" (UE). Thus, the user devices 106A through 106N may be referred to as UEs or UE devices and may be referred to collectively as UEs 106 or on an individual basis as a UE 106.

The base station 102 may be a base transceiver station (BTS) or cell site and may include hardware that enables wireless communication with the UEs 106. The base station 102 may also be equipped to communicate with a network 100. Thus, the base station 102 may facilitate communication between the UEs and/or between the UEs and the network 100. The base station 102 and the UEs may be configured to communicate over the transmission medium using any of various wireless communication technologies such as GSM, CDMA, WLL, WAN, WiFi, WiMAX, etc.

In some embodiments, a UE 106 may be capable of communicating using multiple wireless communication standards. For example, UE 106 may be configured to communicate using two or more of GSM, UMTS, CDMA200, WiMAX, LTE, WLAN, one or more global navigational satellite systems (GNSS, e.g., GPS, or GLONASS), one or more mobile television broadcasting standards (e.g., ATSC-M/H or DVB-H), Bluetooth, Bluetooth low energy (LE), WiFi Direct, Zigbee, etc. In some embodiments, UEs may communicate in a peer-to-peer or ad-hoc manner (illustrated by the dashed lines in FIG. 1). For example, devices may send packets or messages directly between devices rather than through a base station or router using Bluetooth or Wifi Direct. In contrast, communication through a base station or router in a managed infrastructure may be referred to as hierarchical communication.

Both hierarchical and peer-to-peer communications may implement security protocols such as Wi-Fi Protected Access (WPA), WPA2, or Wired Equivalent Privacy (WEP), for example. Devices may authenticate using a key generated from a password or passphrase or using a certificate. In some situations, an additional security protocol such as the extensible authentication protocol (EAP) or transport layer security (TLS) may be used for authentication.

Referring now to FIG. 2, a block diagram illustrating one embodiment of UE 106 is shown. The UE 106 may be a device with wireless network connectivity such as a mobile phone, a hand-held device, a computer or a tablet, or virtually any type of wireless device. In the illustrated embodiment, UE 106 is a mobile phone.

In the illustrated embodiment, UE 106 is configured to communicate wirelessly with access point 103. Access point 103 may be a stationary wireless access point. Access point 103 may be connected to a wide area network such as the Internet in a wired or wireless manner.

The UE 106 may include a processor that is configured to execute program instructions stored in memory. The UE 106 may perform any of the method embodiments described herein by executing such stored instructions. In some embodiments, UE 106 includes a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1xRTT, and separate radios for communicating using each of Wi-Fi and Bluetooth. Other configurations are also possible.

Figure 3:
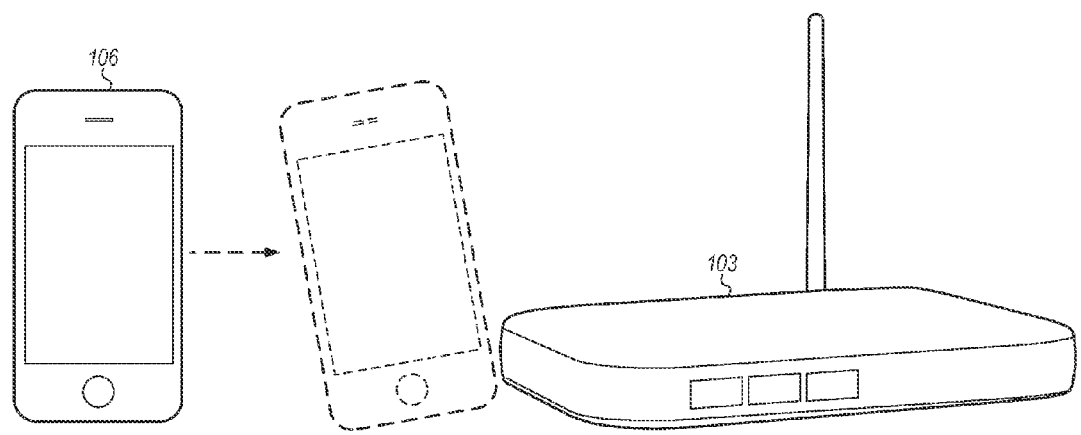
FIG. 3 illustrates exemplary communication between user equipment and an access point.

FIG. 3—Exemplary Communication between UE and Access Point

As described above, there are various situations in which entering a password, selecting a nearby device to communicate with, and/or manually initiating a data transfer may be inconvenient. These situations include guests desiring to access a local wireless network, friends who want to quickly transfer particular data between UEs, and users of various devices desiring to trigger various device functionalities, for example.

FIG. 3 illustrates one embodiment of a methodology for initiating communication between a wireless access point (WAP) and a UE. In the illustrated embodiment, UE 106 is tapped to WAP 103 (i.e., brought into close proximity with WAP 103 and/or bumped with WAP 103). Movement of UE 106 is illustrated by the dashed lines in FIG. 3.

As used herein, the term "tap" refers to a bump condition between respective devices, a particular proximity between respective devices, or both. Thus, in one embodiment, a tap may be detected based on a bump condition and not proximity. In another embodiment, a tap may be detected based on proximity and not a bump condition. In another embodiment, a tap may be detected based on both proximity and a bump condition. A bump condition includes situations where devices are physically bumped together (i.e., the devices make contact) and situations where devices both experience a corresponding physical bump without actually making contact (i.e., a bump between the hands of respective users of the devices). A particular proximity may be detected based on signal strength of a radio frequency (RF) signal, for example, and may be associated with a pre-determined signal strength threshold.

In one embodiment, based on a detected tap, WAP 103 is configured to automatically authenticate UE 106 using a security protocol such as TLS and/or WPA2, for example, without requiring the user of UE 106 to enter a password. In another embodiment, based on the tap, WAP 103 is configured to disable (i.e., not use, bypass, or skip) a security protocol for communications with UE 106. In various embodiments, UE 106 may be one of a variety of UEs as discussed above with reference to FIG. 1. Such automatic authentication or bypassing of a security protocol may facility convenient communication between UE 106 and WAP 103, e.g., a user may be able to tap UE 106 to WAP 103 instead of entering a password or obtaining a key.

In some embodiments, UE 106 and WAP 103 include respective motion sensors such as accelerometers and/or gyroscopes, for example. The motion sensors may detect rapid changes in acceleration associated with a physical bump condition. Thus, the motion sensors may detect physical bump contact between UE 106 and WAP 103, or related physical contact such as contact between a user's hand while holding UE 106 and the housing of WAP 103.

In some embodiments, WAP 103 includes a wireless sensor configured to measure received signal strength of RF packets from UE 106. In some embodiments, UE 106 may also include a wireless sensor configured to measure received signal strength of RF packets from WAP 103. WAP 103 may authenticate UE 106 based on detecting very close proximity of UE 106 to WAP 103 based on measured signal strength. In one embodiment, WAP 103 monitors for UEs within its wireless range and measures the received signal strength of packets from nearby UEs. Based on a very high signal strength (e.g., a signal strength indicating that a UE is within a few centimeters of the housing of WAP 103), WAP 103 may detect close proximity of the UE.

Such automatic authentication may result in security vulnerabilities. For example, a spoofing device may broadcast wireless packets with a very high signal strength in order to masquerade as a device in very close proximity to WAP 103. Thus, in one embodiment, WAP 103 is configured to send a request packet at a low transmission power and automatically authenticate UE 106 only if UE 106 responds to the request packet. In another embodiment, WAP 103 is configured to send a request packet and automatically authenticate UE 106 only if it responds to the request packet within a pre-determined amount of time (i.e., within an amount of time that indicates that the request packet and response packet did not travel more than a small distance).

Requiring physical bump contact as described above may also reduce security vulnerabilities. For example, WAP 103 may query nearby devices after detecting a bump condition for information about the bump condition. Such information may include the time of the bump condition and characteristics of the bump condition such as the severity of the bump, the duration of the bump, etc. In one embodiment, WAP 103 automatically authenticates or skips a security protocol only for nearby devices that correctly respond with information about the bump condition. In this embodiment, it may be very difficult for a malicious entity to "spoof" a bump condition, because only a device that actually experienced the bump condition may be able to provide information about the bump condition.

In embodiments where devices communicate a timestamp associated with a bump condition, the devices may be synchronized to a reference clock or time. The synchronization may be performed by sending packets between devices (i.e., one of the devices may maintain the reference clock) or by synchronizing to a separate reference device (e.g., with a reference clock of a server through the Internet using the network time protocol (NTP)). In one embodiment, WAP 103 may wait a random amount of time before sending a query packet to nearby devices requesting information about the time of a bump condition (i.e., the random amount of time may change between different query packets). This may prevent a malicious device from guessing a timestamp of a bump condition based on a time of receipt of a query packet.

In some embodiments, WAP 103 may require UE 106 to both provide information about a bump condition and be within a certain proximity of WAP 102 (e.g., as determined based on signal strength measurements) in order to automatically authenticate or skip a security protocol for UE 106.

The functionality described above with reference to WAP 103 (e.g., requiring bump information, random waits before sending query packets, requiring both a bump condition and proximity, and so on) may be implemented by UE 106. In addition, UE 106 may prompt a user before automatically authenticating or skipping a security protocol. Thus a user of UE 106 may have an option to cancel a connection or accept the automatic connection.

In one embodiment, WAP 103 includes one or more storage devices and is configured to "back up" data for UEs. In this embodiment, WAP 103 and/or UE 106 may initiate a transfer of data between UE 106 and WAP 103 in response to a tap between UE 106 and WAP 103. For example, UE 106 may back up contact information, stored files, and/or other data to WAP 103. In some embodiments, a user of UE 106 may configure what data is backed up, e.g., using a software application.

WAP 103 and/or UE 106 may be configured to determine signal strength by receiving a packet with a known transmit strength or a packet that includes information corresponding to the transmit strength of the packet. WAP 103 and/or UE 106 may measure received signal strength (RSSI) of packets, and may filter multiple RSSI results in order to determine a more reliable RSSI value (e.g., in order to remove noise in received signal strength measurements). WAP 103 and/or UE 106 may determine distance between each other based on such RSSI values by comparing the difference between the transmit signal strength and the RSSI value (either filtered or unfiltered). WAP 103 and/or UE 106 may change filtering parameters based on the determined distance in order to better remove noise in a signal (e.g., noise caused by multi-path may increase as UE 106 moves further from WAP 103). This technique for determining distance between UE 106 and WAP 103 may be used to determine when UE 106 is within a particular proximity of WAP 103 such that WAP 103 should automatically authenticate UE 106, skip a security protocol for UE 106, or transfer data to/from UE 106, for example.

In one embodiment, WAP 103 and UE 106 are configured to automatically authenticate by exchanging security keys (or one UE may send a security key to the other UE for use in secured communications). For example, UE 106 may send a public key to WAP 103 for use in encrypting authentication communications to UE 106 and vice versa. UE 106 and WAP 103 may perform various handshaking steps during authentication. In various embodiments, various appropriate methodologies for secure automatic authentication may be implemented. After authentication, UE 106 and/or WAP 103 may use various encryption methodologies for further communication between UE 106 and WAP 103.

The techniques described above with reference to a UE and a WAP may be implemented between UEs when communication using a peer-to-peer communication methodology. For example, UE 106A and UE 106B of FIG. 4 (described below) may automatically authenticate or bypass a security protocol based on a tap.

Figure 4:
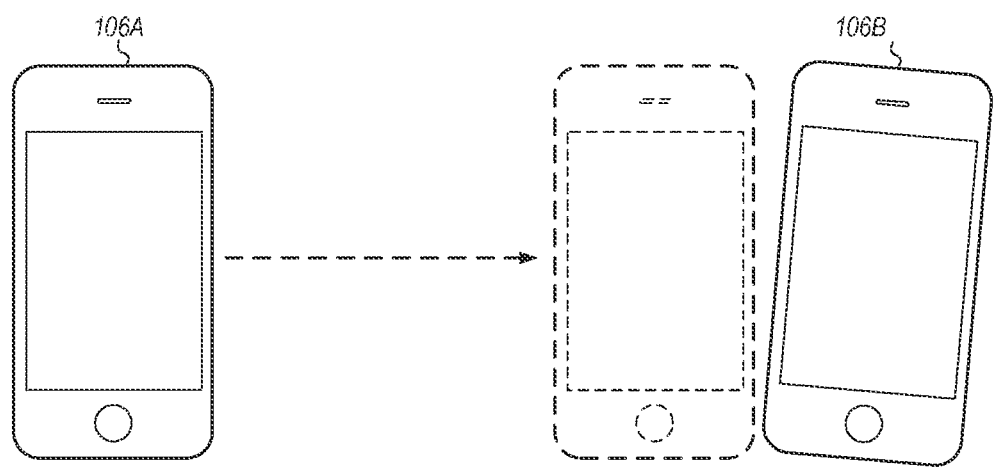
FIG. 4 illustrates exemplary communication between user equipment.

FIG. 4—Exemplary Communication between UEs

FIG. 4 illustrates one embodiment of a methodology for initiating communication between UEs. In the illustrated embodiment, UE 106A is tapped with UE 106B. In the illustrated embodiment, UE 106A and UE 106B are mobile phones. In various embodiments, UE 106A and 106B may be various UEs as described above with reference to FIG. 1.

In one embodiment, in response to the tap, UE 106A is configured to automatically transfer data to UE 106B. The data may include information associated with to a business card (e.g., a vCard) and contact information, for example. In one embodiment, a user of UE 106A may use a software application to configure information to be transferred automatically from UE 106A. In one embodiment, UE 106A may prompt a user before transferring the data. For example, a user may be presented with an option to approve the data transfer or to cancel the data transfer.

In one embodiment, in response to detecting the tap, UE 106A is configured to automatically authenticate with UE 106B using a security protocol. In this embodiment, the automatic authentication may occur without requiring a user of either device to enter a password or pin.

In one embodiment, automatic data transfer and/or authentication may be performed based on both a bump condition and proximity between UEs. This may improve security by ensuring that data transfer and/or authentication do not occur for UEs that are not actually in close proximity. Consider, for example, a situation in which a malicious entity desires to authenticate with another user's UE. In this situation, the malicious entity may monitor the user and attempt to cause a bump condition for a device controlled by the malicious entity at the same time that a bump condition occurs for the user's UE. In this situation, the user's UE may require both a bump condition and an indication of close proximity between the UEs (based on a signal strength measurement, for example). Thus, even if the malicious entity were to time the bump condition perfectly (i.e., bump his or her UE at the same time a bump of the user's UE occurs), automatic authentication would not occur when the malicious entity's UE was not in close proximity to the user's UE. Further, as discussed above, software on the user's UE may allow the user to allow or cancel the authentication before it occurs.

Various techniques for determining proximity and bump conditions between UEs may be used as described above with reference to FIG. 3. In some embodiments, techniques for automatically transferring data and/or automatically authenticating may allow nearby users to conveniently communicate in a secure manner between UEs by tapping, without the inconvenience of selecting UEs from a list of UEs in range or entering passwords, for example.

In one embodiment, UE device 106A is configured to aid in authentication of another UE device to a particular network. For example, UE device 106A may already be authenticated on a particular wireless network. For example, UE device 106A may have been authenticated based on a tap with WAP 103 as described above with reference to FIG. 3. Subsequently, based on a tap with UE device 106B, UE device 106A may be configured to automatically authenticate UE device 106B to the network. For example, UE device 106A may transmit an authentication or security key to UE device 106B that would allow UE device 106B to authenticate with the network (or skip an authentication procedure). In some embodiments, user interfaces on UE device 106A and/or UE device 106B may prompt respective users for input based on detecting a tap. For example, UE device 106A may display a list of options to the user based on a detected tap, and the options may include authenticating the UE device 106B to a particular network. As a further example, UE 106B may present the user with an option of whether or not to join the particular network.

This functionality may be useful in many situations. For example, in the apartment guest situation, a wireless access point may be hard to physically access (e.g., the access point could be stored in a closet). Rather than having to provide a password or force guests to tap the access point, the owner could tap his or her already-authenticated UE device with a guest's UE device to authenticate the guest's device to the home network. As another example, many buildings include multiple distributed wireless access points, which may be difficult to find. Rather than requiring guests to tap a router, an authenticated UE device (such as an IPAD device or a specialized device, for example) could be placed at a front desk and users could tap the UE device to authenticate to the building's network. This may allow easy authentication for those who actually enter the building while preventing unauthorized use by those outside the building.

Wireless Payments and Advertising

In some embodiments, a wireless device may detect taps between the wireless device and other nearby wireless devices using techniques similar to those described above with reference to WAP 103 of FIG. 3 and/or using other techniques.

Based on detecting a tap between a UE and the wireless device, the device may be configured to accept a payment from the UE, e.g., using the Passbook service. For example, a UE user may create an account with such a service and add money or a credit line to the account. A wireless device associated with the service may be placed at a checkout counter. Based on a user placing a UE within a particular proximity of the wireless device, the device may initiate a connection with the UE. The UE and the device may transfer data indicating a payment, such as account information and the amount of the payment.

Similarly, a wireless device may be configured to check-in a user based on the user placing a UE within a particular proximity of the wireless device. Such a wireless device may be implemented at an airport boarding gate, for example. Such a wireless device may also allow a user to "check-in" using a social media application, in order to allow other users to view the check-in location, the number of users checked in a particular check-in location, etc.

A wireless device may also send advertising data to a UE based on movement of the UE and/or calculated distance from the UE. For example, a wireless device may send different advertisement information to a UE depending on where in a particular store the UE is located at a given time (i.e., based on a distance from the wireless device to the UE). Similarly, a wireless device may send different advertisement information to a UE depending on whether the UE has moved recently. Based on movement information generated by a UE, the wireless device may determine what type of user is currently using the UE (e.g., categorized by age, physical characteristics, etc.) and send appropriate advertisement information.

In various embodiments, various wireless devices may be configured to perform various operations based on detecting taps between UEs or between stationary wireless devices and UEs. For example, a printer may be configured to print based on a tap, a door may be configured to unlock based on a tap, etc.

The wireless devices described in various embodiments may be UEs, access points, or other types of wireless devices. The wireless devices may be connected to a database used to store various information such as account information, UE information, advertisement information, etc.

FIG. 5—Flowcharts

Figure 5A:
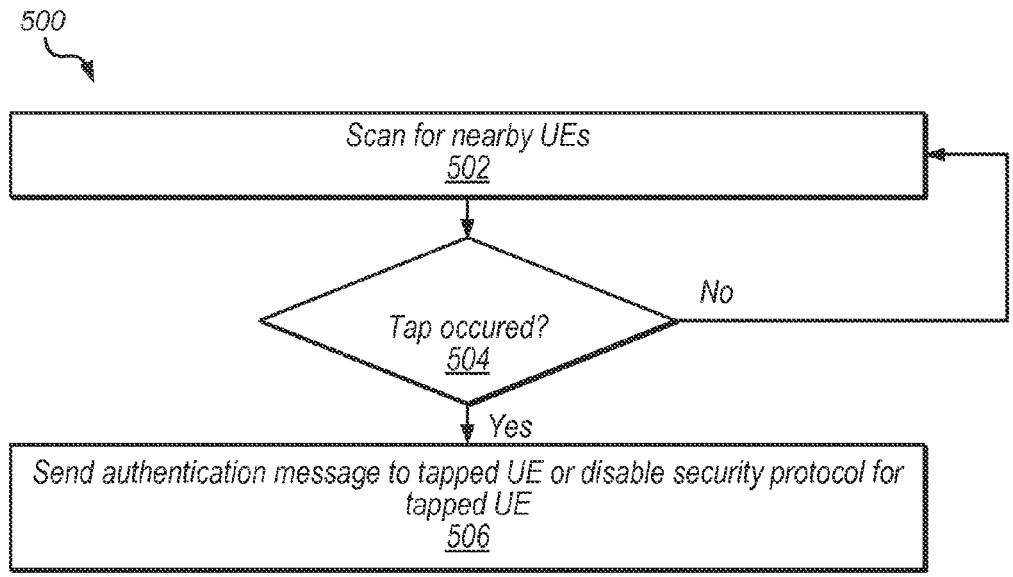
FIGS. 5A-5F are flow diagrams illustrating respective embodiments of methods for exemplary wireless communications.

Referring now to FIG. 5A, a flow diagram illustrating one embodiment of a method 500 for automatic authentication is shown. The method shown in FIG. 5A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. A wireless device performing the steps of method 500 may be a UE, a WAP, or one of various other types of wireless devices. Flow begins at block 502.

At block 502, a scan is performed for nearby UEs. This scan may identify all UEs within range of a particular wireless device. Flow proceeds to block 504.

At block 504, it is determined whether a tap has occurred. As defined above, a tap includes a bump condition and/or a close proximity between devices. If a tap has occurred, flow proceeds to block 506. Otherwise, flow proceeds to block 502.

At block 506, an authentication message is sent to the tapped UE or a security protocol for the tapped UE is disabled. The authentication message may include a security key or certificate. Flow ends at block 506.

Figure 5B:
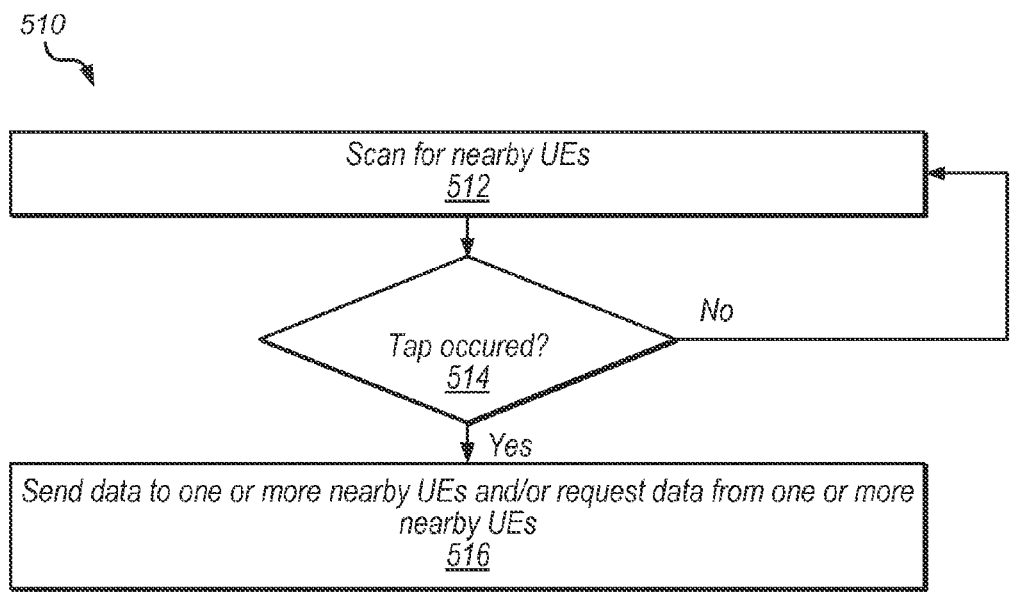

Referring now to FIG. 5B, a flow diagram illustrating one embodiment of a method 510 for automatic data transfer is shown. The method shown in FIG. 5B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. A wireless device performing the steps of method 510 may be a UE, a WAP, or one of various other types of wireless devices. Flow begins at block 512.

At block 512, a scan is performed for nearby UEs. This scan may identify all UEs within range of a particular wireless device. Flow proceeds to block 514.

At block 514, it is determined whether a tap has occurred. As defined above, a tap includes a bump condition and/or a close proximity between devices. If a tap has occurred, flow proceeds to block 512. Otherwise, flow proceeds to block 512.

At block 516, data is sent to and/or requested from one or more nearby UEs. For example, identification or advertising information may be sent to one or more nearby UEs. Similarly, identification or purchase information may be requested from the one nor more nearby UEs. In one embodiment, communication occurs only with a UE with which the tap occurred. In other embodiments, communication may occur with other UEs in addition to the tapped UE. Flow ends at block 516.

Figure 5C:
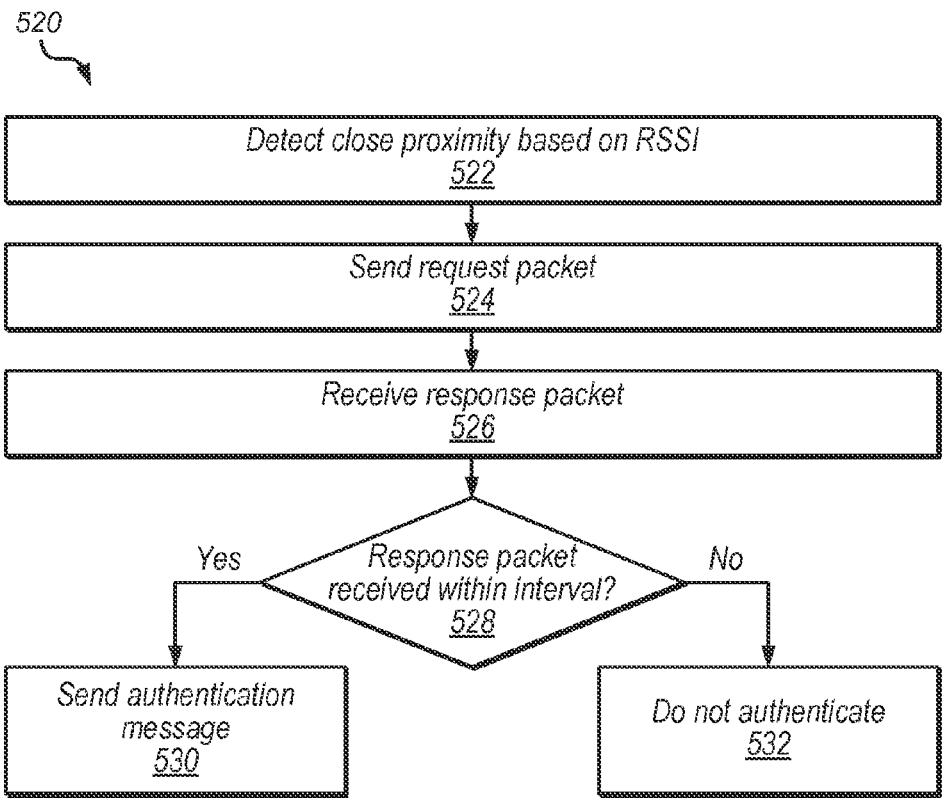

Referring now to FIG. 5C, a flow diagram illustrating one embodiment of a method 520 for verifying proximity of a UE is shown. The method shown in FIG. 5C may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. A wireless device performing the steps of method 520 may be a UE, a WAP, or one of various other types of wireless devices. Flow begins at block 522.

At block 522 a close proximity of a UE is detected based on a received signal strength indication (RSSI) of an RF packet from the UE. In one embodiment, the close proximity may be within a few centimeters. In one embodiment, multiple received signal strengths may be filtered in order to remove noise in a signal strength measurement. Flow proceeds to block 524.

At block 524 a request packet is sent to the UE. The request packet may request a response packet. Flow proceeds to block 526.

At block 526, a response packet is received. The response packet may indicate reception of the request packet. Flow proceeds to block 528.

At block 528, it is determined whether the response packet was received within a particular time interval of sending the request packet. The particular interval may correspond to an expected round-trip travel time of the request and response packets based on the close proximity. If the response packet is received within the particular interval, flow proceeds to block 530. Otherwise, flow proceeds to block 532.

At block 530, an authentication message is sent. The authentication message may include a security key or certificate. The authentication message may allow the UE to communicate with the wireless device performing method 520 using a security protocol. Flow ends at block 530.

At block 532, authentication is not performed. Authentication may not be performed because late reception (or no reception) of the response packet may indicate that a UE may not actually be within close proximity. Flow ends at block 532.

Figure 5D:
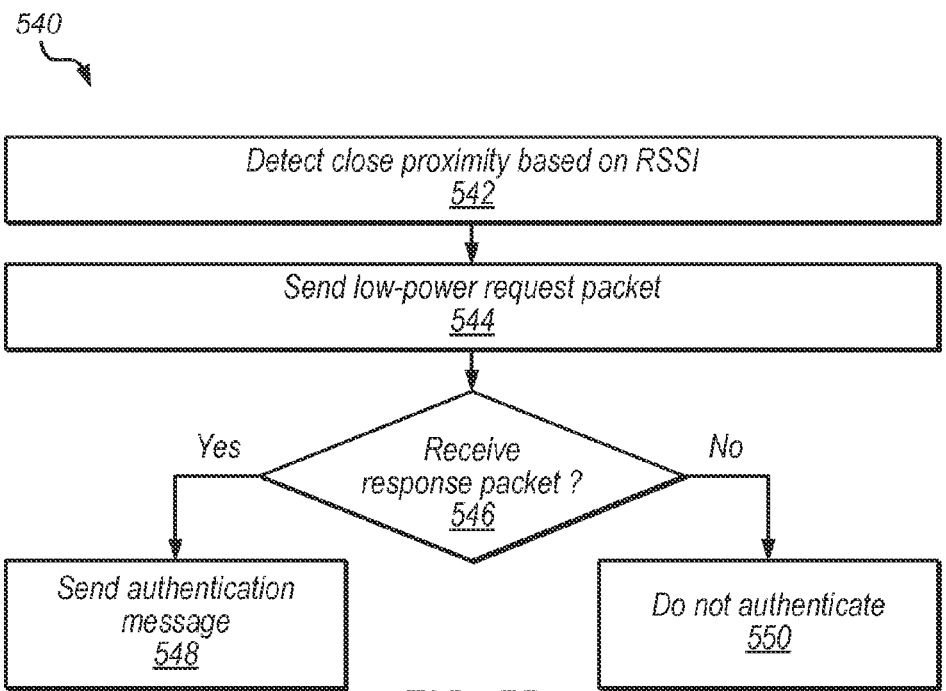

Referring now to FIG. 5D, a flow diagram illustrating one embodiment of a method 540 for verifying proximity of a UE is shown. The method shown in FIG. 5D may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. A wireless device performing the steps of method 540 may be a UE, a WAP, or one of various other types of wireless devices. Flow begins at block 542.

At block 542 a close proximity of a UE is detected based on a received signal strength indication (RSSI) of an RF packet from the UE. In one embodiment, the close proximity may be within a few centimeters. In one embodiment, multiple received signal strengths may be filtered in order to remove noise in a signal strength measurement. Flow proceeds to block 544.

At block 524 a low-power request packet is sent to the UE. The request packet may request a response packet. The low-power request packet may be sent in order to ensure that a high-powered transmitter is not masquerading as a UE in close proximity. In other words, if the high-powered transmitter is not actually in close proximity, it will not receive the low-power request packet. Flow proceeds to block 546.

At block 546, it is determined whether a response packet corresponding to the request packet is received. In one embodiment, the request packet may include a random number, and the response packet may also include the random number. Thus, the step of block 546 may include checking that a number included in the response packet matches a number sent in the request packet. If the response packet is received, flow proceeds to block 548. Otherwise, flow proceeds to block 550.

At block 548, an authentication message is sent. The authentication message may include a security key or certificate. The authentication message may allow the UE to communicate with the wireless device performing method 540 using a security protocol. Flow ends at block 548.

At block 550, authentication is not performed. Authentication may not be performed because no reception of the response packet may indicate that a UE may not actually be within close proximity. Flow ends at block 550.

Figure 5E:
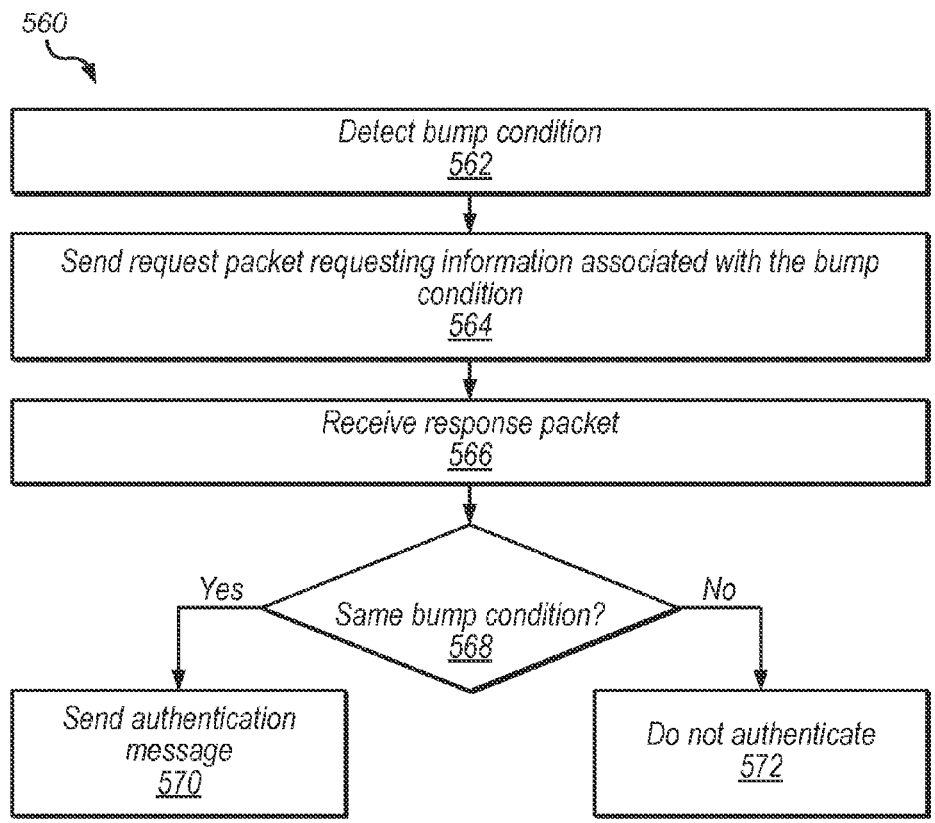

Referring now to FIG. 5E, a flow diagram illustrating one embodiment of a method 560 for verifying a bump condition with a UE is shown. The method shown in FIG. 5E may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. A wireless device performing the steps of method 560 may be a UE, a WAP, or one of various other types of wireless devices. Flow begins at block 562.

At block 562, a bump condition is detected. The bump condition may be detected based on information from a motion sensor. Flow proceeds to block 564.

At block 564 a request packet requesting information associated with the bump condition is sent. The request packet may request information about the bump such as timing information, magnitude information, duration information, etc. Flow proceeds to block 566.

At block 566, a response packet is received. The response packet may include request information about the bump condition. Flow proceeds to decision block 568.

At decision block 568, it is determined whether the bump condition for which information was included in the response packet is the same bump condition as that detected in block 562. Thus, if the information does not correspond to the same bump condition, a device sending the response packet may not have experienced the same bump condition. If the same bump condition is detected, flow proceeds to block 570. Otherwise, flow proceeds to block 572.

At block 570, an authentication message is sent. The authentication message may include a security key or certificate. The authentication message may allow the UE to communicate with the wireless device performing method 540 using a security protocol. Flow ends at block 570.

At block 572, authentication is not performed. Authentication may not be performed because late reception (or no reception) of the response packet may indicate that a UE may not actually be within close proximity. Flow ends at block 572.

Figure 5F:
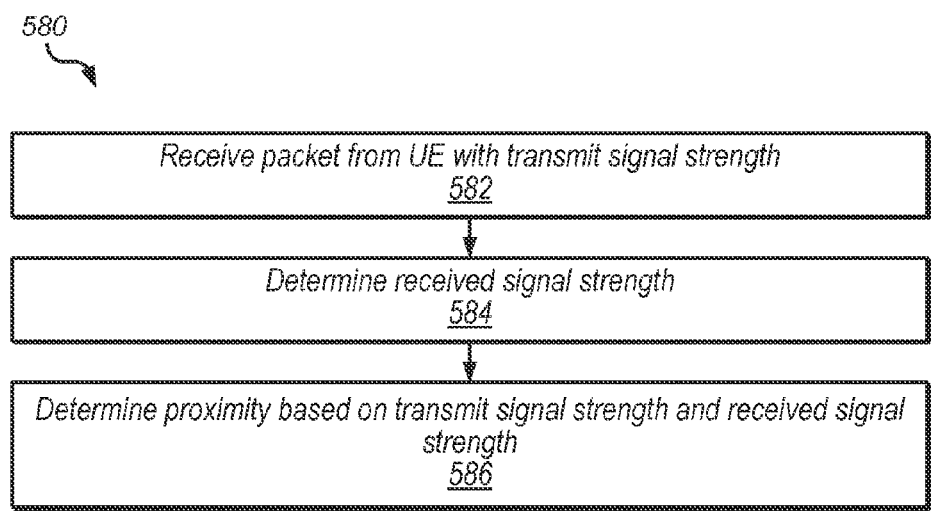

Referring now to FIG. 5F, a flow diagram illustrating one embodiment of a method 580 for verifying a bump condition with a UE is shown. The method shown in FIG. 5F may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. A wireless device performing the steps of method 580 may be a UE, a WAP, or one of various other types of wireless devices. Flow begins at block 582.

At block 582, a packet is received from a UE with a transmit signal strength. The transmit signal strength may be known, or may be indicated by the packet. Flow proceeds to block 584.

At block 584, the received signal strength of the packet is determined. The received signal strength of the packet may correspond to the distance of the UE from the wireless device performing the steps of method 580. Flow proceeds to block 586.

At block 586, proximity is determined based on the transmit signal strength and received signal strength. For example, a path loss may be determined based on a difference between the received signal strength and the transmit signal strength. In one embodiment, the proximity may be determined based on multiple received packets. Flow ends at block 586.

The method elements of FIGS. 5A-5F may be combined to form additional methods, and method elements may be performed in various orders or may be omitted. For example, one or more of the methods of FIGS. 5C-5F may be used to perform the determination of blocks 504 and 514 of the methods of FIGS. 5A and 5B.

Figure 6:
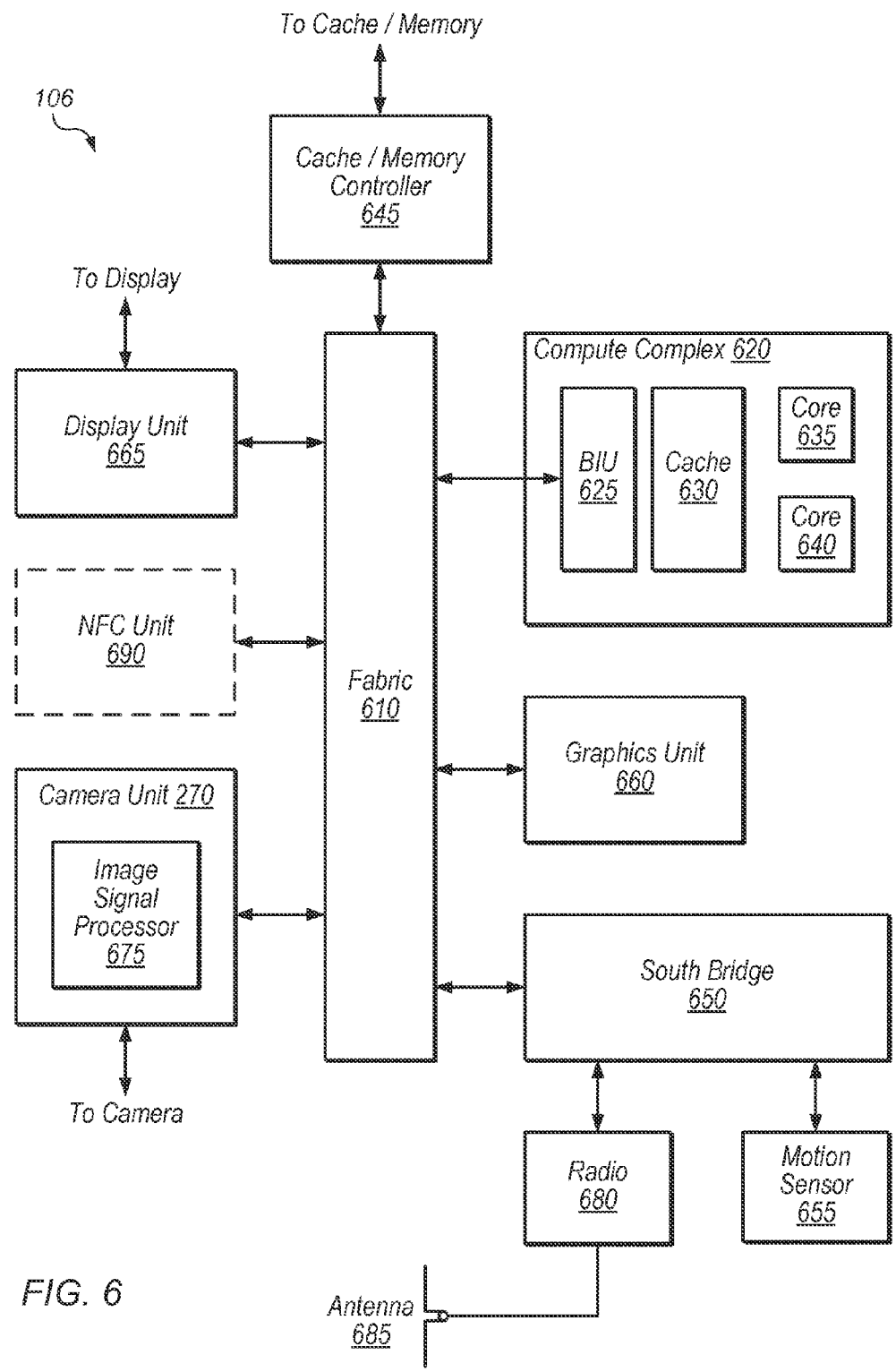
FIG. 6 is a block diagram illustrating one embodiment of exemplary user equipment.

FIG. 6—UE Block Diagram

Referring now to FIG. 6, a block diagram illustrating one embodiment of exemplary portions of UE 106 is shown. In the illustrated embodiment, UE 106 includes fabric 610, compute complex 620, south bridge 650, motion sensor 655, cache/memory controller 645, graphics unit 660, display unit 665, camera unit 670, radio 680, and optional NFC unit 690. The illustrated elements of UE 106 except for radio 680 and motion sensor 655 may be included in a system-on-a-chip (SOC). In the following discussion, exemplary embodiments of each of the structures of the illustrated embodiment of UE 106 are described. However, it is noted that the illustrated partitioning of resources is merely one example of how UE 106 may be implemented. Alternative configurations and variations are possible and contemplated.

Fabric 610 may include various interconnects, buses, MUX's, controllers, etc., and may be configured to facilitate communication between various elements of UE 106. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in UE 106 may be configured to maintain coherency between various caches of UE 106. BIU 625 may be configured to manage communication between compute complex 620 and other elements of UE 106. Processor cores such as cores 635 and 640 may be configured to execute instructions of a particular instruction set architecture (ISA) such as ARM®, INTEL® 64, IA-32, AMD 64®, POWERPC®, or MIPS®, for example.

In some embodiments, processor cores such as core 635 may be configured to execute program instructions of various programs. In some embodiments, such programs may include instructions that indicate operations such as automatically transferring data or authenticating using a security protocol (e.g., using radio 680) in response to a bump condition and/or proximity with another device (e.g., detected using radio 680 and/or motion sensor 655). Such program instructions may be stored in a memory coupled to cache/memory controller 645, in a cache such as cache 630, or elsewhere in UE 106.

As described herein, the UE 106 may include hardware and software components for implementing a method for detecting taps between UE 106 and other wireless devices. A core such as core 635 of UE 106 may be configured to implement part or all of the methods described herein, e.g., by executing program instructions stored on a memory medium (e.g., a non-transitory computer-readable memory medium). In other embodiments, a processing element of UE 106 configured to implement all or part of the techniques described herein may be configured as a programmable hardware element, such as an FPGA (Field Programmable Gate Array), or as an ASIC (Application Specific Integrated Circuit).

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches. In some embodiments, cache/memory controller 645 may be coupled to a non-volatile storage device, such as a NAND storage device, for example. In one embodiment, cache/memory controller 645 includes a secure ROM which may be configured as a boot ROM and may include a bootloader. Such a bootloader may be executed by a core such as core 635 during boot-up or initialization of UE 106.

Graphics unit 660 may include one or more processors and/or one or more graphics processing units (GPU's). Graphics unit 660 may receive graphics-oriented instructions, such OPENGL® or DIRECT3D® instructions, for example. Graphics unit 660 may execute GPU instructions or perform other operations based on the received graphics-oriented instructions. Graphics unit 660 may generally be configured to process large blocks of data in parallel and may build images in a frame buffer for output to a display. Graphics unit 660 may include transform, lighting, triangle, and/or rendering engines in one or more graphics processing pipelines. Graphics unit 660 may output pixel information for display images.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or external display).

South bridge 650 may include various elements configured to implement: universal serial bus (USB) communications, security, audio, and/or low-power always-on functionality, for example. South bridge 650 may also include interfaces such as pulse-width modulation (PWM), general-purpose input/output (GPIO), serial peripheral interface (SPI), and/or inter-integrated circuit (I2C), for example.

In the illustrated embodiment, south bridge 650 is coupled to motion sensor 655. Motion sensor 655 may include one or more accelerometers, one or more gyroscopes, and/or other sensors. In one embodiment, south bridge 650 is coupled to motion sensor 655 through an SPI interface. In other embodiments, south bridge 650 may be coupled to motion sensor 655 using various other appropriate interfaces. In one embodiment, motion sensor 655 includes an accelerometer configured to measure acceleration of UE 106 in one or more directions. In one embodiment, the accelerometer is a 3-axis accelerometer. In one embodiment, motion sensor 655 includes a gyroscope configured to measure orientation of UE 106. In one embodiment, the gyroscope is a 3-axis gyroscope. In various embodiments, information from motion sensor 655 is available to various elements of UE 106 through fabric 610 and south bridge 650.

In the illustrated embodiment, south bridge 650 is also coupled to radio 680. Radio 680 may be coupled to south bridge 650 using an inter-integrated circuited (I2C) or high-speed inter-chip (HSIC) interface, for example. Radio 680 may be configured to perform various functions indicated by compute complex 620. Radio 680 may also include one or more processing elements, and may perform various functions implemented by such processing elements. Radio 680 may be configured to communicate with other devices using one or more of various wireless communications standards, such as GSM, CDMA, WLL, WAN, WiFi, WiMAX, WiFi Direct, Bluetooth, Zigbee, etc. In some embodiments, UE 106 includes multiple radios implementing different wireless communication standards. In the illustrated embodiment, radio 680 is coupled to antenna 685 in order to facilitate reception and/or transmission of wireless signals.

In the illustrated embodiment, camera unit 670 includes an image signal processor 675 and may be coupled to a camera. In one embodiment, a camera is coupled to camera unit 670 through a MIPI® camera interface. In some embodiments, camera unit 670 receives captured images from the camera and image signal processor 675 is configured to process captured image data. In some embodiments, UE 106 may be configured to capture an image using camera unit 670 based on a detected tap between wireless devices.

In the illustrated embodiment, UE 106 also includes optional near field communications (NFC) unit 690. In one embodiment, NFC unit 690 is configured to communicate with other wireless devices using magnetic induction between devices in very close proximity. In one embodiment, NFC unit 690 is not included in UE 106, e.g., because a tap may be detected using radio 680 and/or motion sensor 655, thus NFC unit 690 may be unnecessary. In another embodiment, NFC unit 690 may be configured to detect nearby wireless devices using NFC. In this embodiment, the NFC unit 690 may serve as a further layer of security in confirming that a detected tap occurred between devices that were actually in close proximity.

Figure 7:
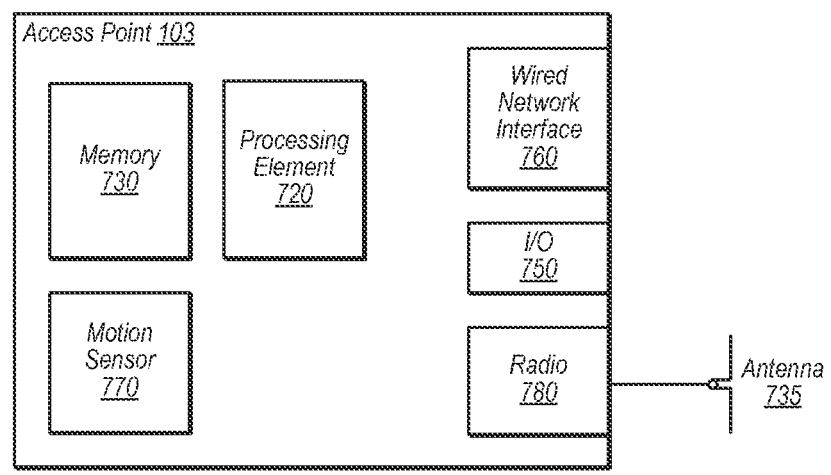
FIG. 7 is a block diagram illustrating one embodiment of an exemplary access point.

FIG. 7—Access Point Block Diagram

Referring now to FIG. 7, a block diagram illustrating one embodiment of an exemplary access point 103 is shown. In the illustrated embodiment, wireless access point (WAP) 103 includes processing element 720, memory 730, wired network interface 760, I/O element 750, radio 780, and motion sensor 770. Radio 780 is coupled to antenna 735. In various embodiments, processing element 720 is configured to initiate various automatic data transfers, bypassing of security protocols, and/or automatic wireless authentication in response to detecting taps between wireless devices using radio 780.

Memory 730 may be volatile or non-volatile and may store data structures and/or program instructions associated with various techniques described herein. Memory 730 may be implemented using any appropriate storage technology such as various types of SDRAM, NAND storage, disc storage, or ROM, for example.

Wired network interface 760 may be configured to facilitate communication between WAP 103 and one or more networks. The one or more networks may include a wide area network such as the internet, local networks, and/or private networks.

I/O element 750 may be configured to communicate with various devices using various appropriate communications protocols such as USB, FireWire, etc.

Radio 780 may be configured to perform various functions indicated by processing element 720. Radio 780 may also include one or more processing elements, and may perform various functions implemented by such processing elements. Radio 780 may be configured to communicate with other devices using one or more of various wireless communications standards, such as WiFi, WiMAX, WiFi Direct, Bluetooth, Zigbee, etc. In some embodiments, WAP 103 includes multiple radios implementing different wireless communication standards. In the illustrated embodiment, radio 780 is coupled to antenna 735 in order to facilitate reception and/or transmittal of wireless signals. In some embodiments, WAP 103 includes multiple antennas.

In one embodiment, antenna 735 is configured such that a signal strength exceeding a particular threshold signal strength (e.g., a threshold used to indicate close proximity) may only be attained by a UE having a particular orientation with respect to WAP 103. For example, antenna 735 may be a directional antenna such that a UE must be placed in a certain direction relative to WAP 103 to attain a signal strength above the threshold. As another example, antenna 735 may be configured such that only a certain orientation of a UE antenna (e.g., in parallel, perpendicular to, etc. WAP 103) will produce a signal strength above the threshold. In this embodiment, a user may place a UE near a particular portion of WAP 103 or in a certain orientation in order to initiate automatic authentication, disabling of a security protocol, and/or automatic data transfer.

Motion sensor 770 may include accelerometers and/or gyroscopes and may be configured to detect a physical bump condition associated with WAP 103 based on changes in velocity and/or orientation, for example.

In one embodiment, processing element 720 is configured to execute program instructions stored in memory 730. For example, processing element 720 may execute program instructions and control radio 780 to monitor for nearby wireless devices based on the instructions. Processing element 720 may be configured to detect a close proximity condition of a wireless device based on received signal strength measurements from radio 780. Processing element 720 may be configured to detect a bump condition of WAP 103 based on information from motion sensor 770. Processing element 720 may be configured to bypass a security protocol based on the bump and/or proximity conditions. Processing element 720 may be configured to automatically authenticate a nearby wireless device based on a tap. Processing element 720 may be configured to transfer data to a nearby wireless device and/or receive data from a nearby wireless devices based on a tap. Processing element 720 may also be configured to perform various functionality for verifying a tap as described above with reference WAP 103 of FIG. 3.

Figure 8:
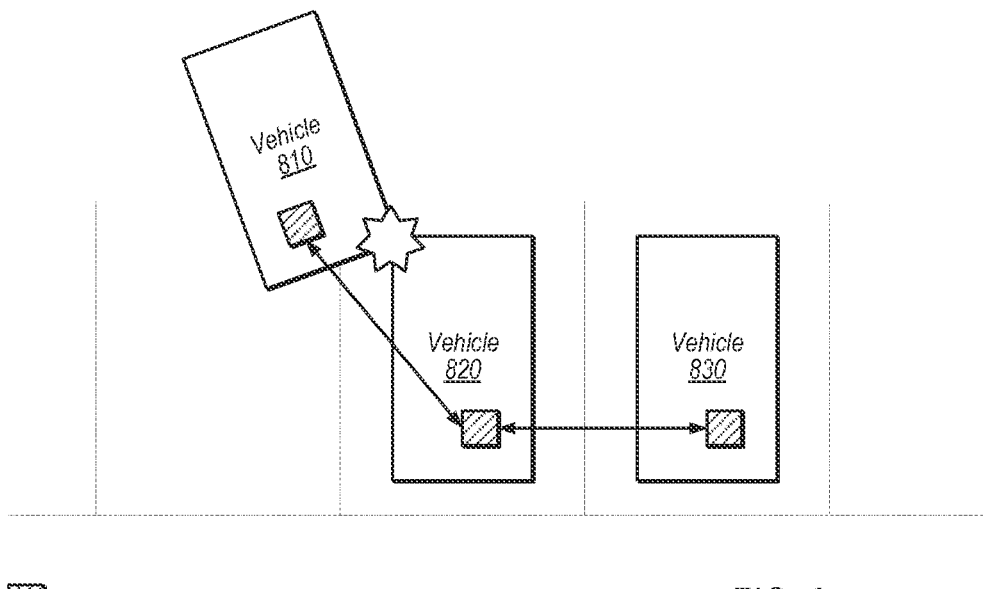
FIG. 8 is a diagram illustrating an exemplary vehicle collision.

FIG. 8—Vehicle Collision

FIG. 8 illustrates one embodiment of a methodology for identifying perpetrators of vehicle collisions. In the illustrated embodiment, vehicles 810, 820, and 830 each include a wireless sensor. The wireless sensors may be included in UEs (e.g., for WiFi, WiFi Direct, and/or Bluetooth communication). The wireless sensors may be included in the vehicles (e.g., for wireless communications through Bluetooth or some other wireless specification between UEs and the vehicle).

In the illustrated embodiment, vehicle 810 collides with vehicle 820, causing a physical bump condition between vehicle 810 and vehicle 820. Based on the physical bump condition, the wireless sensors are configured to transfer information associated with the collision. The information may indicate one of more of: the time of the collusion, identification information for vehicles that experienced the bump condition, identification information for vehicles that were nearby when the bump condition occurred, the location of the vehicles at the time the bump condition occurred (e.g., as ascertained using GPS units associated with the vehicles) and so on. The bump condition may be detected by a motion sensor included in a UE (e.g., a UE such as a mobile phone of a passenger in a vehicle) or a motion sensor included in the vehicle itself.

Generally, when a UE detects a bump condition, it may be configured to gather as much information as possible about other nearby wireless devices, which may use various different wireless protocols. Thus, a UE in a vehicle that is a victim of a hit and run may obtain identification information associated with both a mobile device carried by a driver of the perpetrating vehicle and wireless devices included in the vehicle itself (such as Bluetooth devices, for example) as well as information about other nearby wireless devices (e.g., those not associated with either vehicle).

For example, a wireless sensor associated with vehicle 820 may monitor for nearby wireless sensors. A motion sensor associated with vehicle 820 may detect the bump condition and the wireless sensor associated with vehicle 820 may send a packet to detected nearby wireless sensors with information and/or send a request packet for information. Similarly, a wireless sensor associated with vehicle 810 may send and/or request information. Thus, if vehicle 810 departs without exchanging information with the owner of vehicle 820, the owner of vehicle 820 may be able to identify the perpetrator of the hit and run. Similarly, identification of vehicle 830 in this example situation may allow the owner of vehicle 820 to identify potential witnesses to the collision.

In the illustrated embodiment, the vehicles are shown in respective parking spaces, but in other embodiments, similar techniques may be used for various types of vehicle collisions.

In one embodiment, wireless sensors associated with respective vehicles may be configured to determine distances between the wireless sensors. For example, the wireless sensors may send and receive packets and measure signals strengths of the packets. The sensors may filter signal strength measurements to remove noise. The sensors may determine various zones corresponding to different distances between sensors, and may track what nearby sensors are in what zones. The various functionality described herein as being performed by the sensors may also be performed by processing elements associated with the sensors.

In this embodiment, based on a detected bump condition, one or more nearby wireless sensors may be configured to transmit information corresponding to distances between nearby wireless sensors. Using this information, a mapping of vehicles involved in an accident may be reconstructed. Thus, a motorist who causes an accident by venturing too near another vehicle may be identified, even if he or she is not affected by the accident.

In another embodiment, a vehicle may be associated with one or more cameras (e.g., a camera included in a UE inside the vehicle or camera mounted on the vehicle itself). In this embodiment, the camera may capture an image or a video based on a detected bump condition and/or proximity. The images and/or video may be used to identify those responsible for a collision. Similarly, the images and/or video may allow for evaluation of driving skills. For example, drivers who drive too close to other vehicles may exchange data with those vehicles based on proximity, and images and/or video may be used to show the proximity.

Theft

Further, techniques related to automatic data transfer based on proximity and/or bump conditions may be used to determine those responsible for various security breaches. For example, consider a situation in which a man walking down the street is robbed. Based on one or more bump conditions caused by the robbery, a UE on the man's person is configured to request, send, and/or receive information from nearby UEs. The information may include motion information in order to determine another UE involved in any struggle involved in the theft (e.g., the robber's UE). The information may include identification information that may be used to identify the robber and/or nearby witnesses to the crime.

In one embodiment, such techniques may be used to determine information regarding vehicle thefts. For example, in response to detected a bump condition, a vehicle may transmit a request packet requesting a packet from a known UE (e.g., a UE associated with the owner of the vehicle). If the vehicle does not receive a response to the request packet (e.g., because the bump condition was caused by an intruder stealing the vehicle), the vehicle may be configured to sound an alarm and/or exchange information with nearby wireless sensors (e.g., information regarding the time of the theft and identification of nearby vehicles).

Similar techniques may be used to detect theft of various devices with associated motion sensors and wireless sensors, and are in no way limited to the particular examples described herein.

Additional Techniques based on Bump and/or Proximity Detection

In some embodiments, a UE or access point is configured to perform further functions in response to bump and/or proximity detection. For example in one embodiment, a UE such as a laptop computer is configured to skip a password entry step during user logon in response to detecting bump or proximity of another UE of the user, such as a mobile phone, for example. In this example, a prior authentication between the laptop and the mobile phone may map the two devices, e.g., by transferring a key. Thus, based on detecting a bump or proximity by the known mobile phone, the laptop may be configured to skip a password entry step. In other embodiments, other actions may be performed, such as executing a particular software application, backup of data, etc.

Similarly, after authenticating a device (e.g., for a first time) based on bump and/or proximity, an access point or UE may be configured to recognize the device at a later point in time and authenticate without bump and/or proximity. For example, the access point or UE may exchange a shared key with the device, or store an ID associated with the device. In one exemplary embodiment, a UE included in a vehicle is configured to communicate with another UE (e.g., a mobile phone) based on an initial tap between the vehicle UE and the other UE.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless access point, comprising:
an antenna for wireless communications; a processing element; and
a motion sensor configured to detect a bump condition involving the wireless access point and a first User Equipment (UE) device;
wherein the processing element is configured to:
automatically initiate an authentication procedure with the first UE device in response to detection of the bump condition; and
automatically initiate an authentication procedure with a second UE device in response to receiving information indicating a second bump condition between the first UE device and the second UE device subsequent to authenticating the first UE device, wherein the information is transmitted by the first UE device:
waiting for a random time interval to elapse after detecting the second bump condition;
requesting a timestamp associated with the second bump condition after the waiting;
receiving a timestamp from the second UE device; and
determining that the timestamp corresponds to the second bump condition prior to transmitting the information to the wireless access point.

2. The wireless access point of claim 1,
wherein the processing element is configured to automatically initiate the authentication procedure with the second UE device in response to a selection by a user of the first UE device to authenticate the second UE device based on the second bump condition.

3. The wireless access point of claim 1,
wherein the wireless access point is configured to request information from the first UE device about the bump condition; and
wherein the wireless access point is configured to automatically initiate the authentication procedure with the first UE device in response to receiving information indicating that the first UE device experienced the bump condition; and
wherein the wireless access point is configured to automatically initiate the authentication procedure with the second UE in response to receiving information indicating that the first UE device and the second UE device experienced the same second bump condition.

4. The wireless access point of claim 3, wherein the information includes a timestamp associated with the bump condition and a magnitude of the bump condition.

5. The wireless access point of claim 1, further comprising:
a wireless sensor configured to detect a particular proximity between the first UE device and the wireless access point;
wherein the processing element is configured to automatically initiate the authentication procedure only in response to both the detected bump condition and the detected particular proximity.

6. A method, comprising:
performing, by a wireless access point:
monitoring for nearby wireless User Equipment (UE) devices; detecting a bump condition; and authenticating a first UE device associated with the bump condition in
response to the detecting; and subsequent to authenticating the first UE device, authenticating a second UE device in response to receiving information indicating a second bump condition between the first UE device and the second UE device, wherein the information is transmitted by the first UE device:
waiting for a random time interval to elapse after detecting the second bump condition;
requesting a timestamp associated with the second bump condition after the waiting;
receiving a timestamp from the second UE device; and
determining that the timestamp corresponds to the second bump condition prior to transmitting the information to the wireless access point.

7. The method of claim 6, further comprising:
receiving information from the first UE device in response to the bump condition;
comparing the received information with information about the detected bump condition; and
determining that the received information corresponds to the detected bump condition.

8. The method of claim 6, further comprising:
receiving a communications packet from the first UE device;
determining a difference between a transmit signal strength and received signal strength of the packet; and
determining a proximity of the first UE device based on the determining the difference;
wherein the authenticating is performed in response to the detecting and the determined proximity.

9. The method of claim 8, further comprising:
sending first information to the first UE device based on a first proximity of the UE device to the wireless access point; and
sending second information to the first UE device based on a second, different proximity of the UE device to the wireless access point.

10. The method of claim 6, further comprising:
waiting for a random time interval to elapse after detecting the bump condition;
requesting a timestamp associated with the bump condition after the waiting;
receiving a timestamp from the first UE device; and
determining that the timestamp corresponds to the bump condition.

11. A User Equipment (UE) device, comprising
an antenna for wireless communications; a processing element; and
a motion sensor configured to detect a bump condition involving the UE device and a wireless access point;
wherein the UE device is configured to automatically participate in an authentication procedure with the wireless access point in response to the detected bump condition; and
wherein the UE device is configured to, in response to detecting a second bump condition involving the UE device and a second UE device, transmit information to the wireless access point to cause the wireless access point to automatically participate in an authentication procedure with the second UE device, including to:
wait for a random time interval to elapse after detecting the second bump condition;
request a timestamp associated with the second bump condition after the waiting;
receive a timestamp from the second UE device; and determine that the timestamp corresponds to the second bump condition prior to transmitting the information to the wireless access point.

12. The UE device of claim 11, further comprising:
a wireless sensor configured to detect a particular proximity between the UE device and the wireless access point;
wherein the UE device is configured to automatically participate in the authentication procedure with the wireless access point only in response to both the detected bump condition and the detected particular proximity.

13. The UE device of claim 11, wherein the UE device is configured to send information associated with the bump condition to the wireless access point before participating in the authentication procedure.

14. The UE device of claim 11, wherein the UE device is configured to:
receive bump information from the second UE device; and
transmit the information to the wireless access point only in response to determining that the bump information corresponds to the detected second bump condition.

* * * * *